(12) United States Patent
Sasaki et al.

(10) Patent No.: US 11,333,516 B2
(45) Date of Patent: May 17, 2022

(54) LANE GUIDANCE SYSTEM AND LANE GUIDANCE PROGRAM

(71) Applicants: AISIN CORPORATION, Kariya (JP); TOYOTA JIDOSHA KABUSHIKI KAISHA, Toyota (JP)

(72) Inventors: Kenji Sasaki, Okazaki (JP); Xin Jin, Nagoya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/644,224

(22) PCT Filed: Oct. 29, 2018

(86) PCT No.: PCT/JP2018/040074
§ 371 (c)(1),
(2) Date: Mar. 4, 2020

(87) PCT Pub. No.: WO2019/088012
PCT Pub. Date: May 9, 2019

(65) Prior Publication Data
US 2020/0209007 A1     Jul. 2, 2020

(30) Foreign Application Priority Data
Nov. 6, 2017  (JP) .............................. JP2017-213509

(51) Int. Cl.
*G01C 21/36*     (2006.01)
*G08G 1/0969*    (2006.01)

(52) U.S. Cl.
CPC ........... *G01C 21/36* (2013.01); *G08G 1/0969* (2013.01)

(58) Field of Classification Search
CPC .............................. G01C 21/36; G08G 1/0969
See application file for complete search history.

(56) References Cited

U.S. PATENT DOCUMENTS

| 6,700,505 B2 * | 3/2004 | Yamashita | G01C 21/3658 340/901 |
| 2014/0195069 A1 * | 7/2014 | Morimoto | B60W 30/18154 701/1 |

FOREIGN PATENT DOCUMENTS

| JP | 2003-240587 A | 8/2003 |
| JP | 2007-121031 A | 5/2007 |

(Continued)

OTHER PUBLICATIONS

International Search Report of PCT/JP2018/040074 dated Dec. 11, 2018 [PCT/ISA/210].

*Primary Examiner* — Mathew Franklin Gordon
(74) *Attorney, Agent, or Firm* — Sughrue Mion, PLLC

(57) ABSTRACT

Provided is lane guidance system for decreasing the possibility that a user is misled including: a proposed travel route acquisition unit that acquires a proposed travel route of a vehicle; a successive intersection determination unit that determines whether a distance between a first intersection that is a guidance intersection on the proposed travel route and a second intersection that follows the first intersection is within a prescribed distance. Based on the proposed travel route, a travelable lane acquisition unit acquires a travelable lane that the vehicle needs to travel along when entering the first intersection to exit in a specific exiting direction of the first intersection, when the vehicle needs to exit from the first intersection in the exiting direction to travel along the proposed travel route. Before arriving at the first intersection, the lane guidance unit selects and proposes, as a recommended lane from the travelable lane, a lane that the vehicle needs to travel along when entering the first intersection after exiting from the first intersection, a lane that the vehicle needs to travel along when entering the second intersection to exit in a specific exiting direction of the second intersection, when the vehicle needs to exit from the (Continued)

second intersection in the exiting direction to travel along the proposed travel route when the a distance between the first intersection and the second intersection is within a prescribed distance.

3 Claims, 4 Drawing Sheets

(56) References Cited

FOREIGN PATENT DOCUMENTS

| | | |
|---|---|---|
| JP | 2011-099815 A | 5/2011 |
| JP | 2011-145169 A | 7/2011 |

* cited by examiner

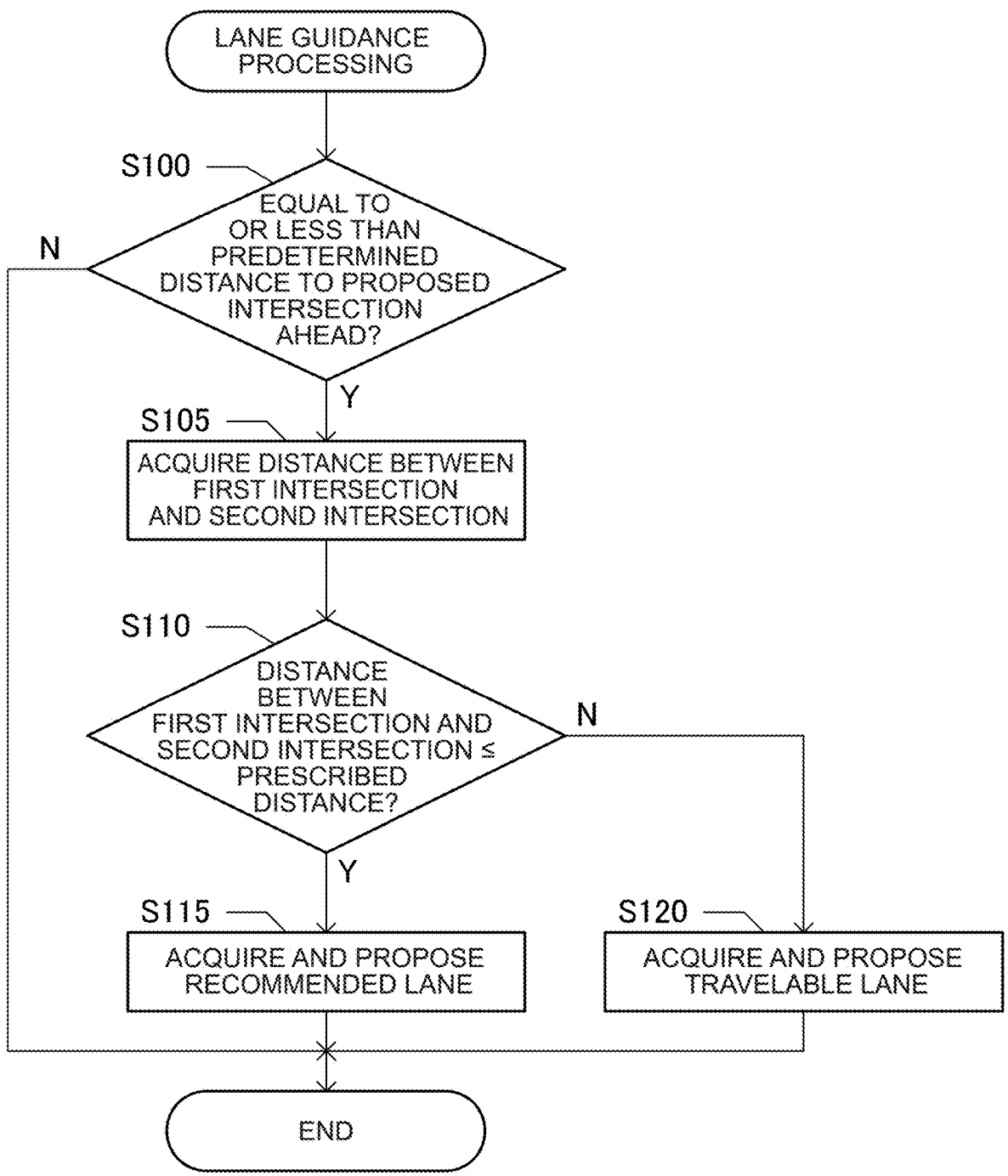

LANE GUIDANCE SYSTEM AND LANE GUIDANCE PROGRAM

CROSS REFERENCE TO RELATED APPLICATIONS

This application is a National Stage of International Application No. PCT/JP2018/040074, filed Oct. 29, 2018, claiming priority to Japanese Patent Application No. 2017-213509, filed Nov. 6, 2017, the contents of which are incorporated in their entirety.

TECHNICAL FIELD

The present disclosure relates to a lane guidance system and a lane guidance program.

BACKGROUND ART

Techniques for proposing a recommended lane to a vehicle user are known. For example, Patent Document 1 discloses a technique of displaying a lane of a road on which the vehicle is traveling and a specified traveling direction of each lane, and selecting and emphasizing a recommended traveling lane among the lanes.

RELATED ART DOCUMENTS

Patent Documents

Patent Document 1: Japanese Unexamined Patent Application Publication No. 2007-121031 (JP 2007-121031 A)

SUMMARY OF THE DISCLOSURE

Problem to be Solved by the Various Aspects of the Disclosure

In the related art described above, there is a case of misleading a user since there is one recommended lane. That is, there is a case of misleading the user that it is necessary to travel along a specific lane. As a result, there is a case of inducing the user to change lanes forcefully or inducing the user to change to a lane with traffic congestion.

The present disclosure has been made in view of the forgoing issue, and therefore has an aspect to provide a technology that enables the possibility of misleading the user to be reduced.

Means for Solving the Problem

In order to achieve the above aspect, a lane guidance system of the present disclosure includes: a proposed travel route acquisition unit that acquires a proposed travel route; a successive intersection determination unit that determines whether a distance between a first intersection that is a guidance intersection on the proposed travel route and a second intersection that is a guidance intersection immediately after the first intersection is within a prescribed distance, based on the proposed travel route; a travelable lane acquisition unit that acquires a travelable lane that the vehicle needs to travel along when entering the first intersection to exit in a specific exiting direction of the first intersection, when the vehicle needs to exit from the first intersection in the exiting direction to travel along the proposed travel route; and a lane guidance unit that selects and proposes as a recommended lane from the travelable lane, a lane that the vehicle needs to travel along when entering the first intersection, to travel along, after exiting from the first intersection, a lane that the vehicle needs to travel along when entering the second intersection to exit in a specific exiting direction of the second intersection, when the vehicle needs to exit from the second intersection in the exiting direction to travel along the proposed travel route, in a case where a distance between the first intersection and the second intersection is within a prescribed distance, and that proposes the travelable lane in a case where the distance between the first intersection and the second intersection is not within the prescribed distance.

A lane guidance program of the present disclosure causes a computer to function as: a proposed travel route acquisition unit that acquires a proposed travel route; a successive intersection determination unit that determines whether a distance between a first intersection that is a guidance intersection on the proposed travel route and a second intersection that is a guidance intersection immediately after the first intersection is within a prescribed distance, based on the proposed travel route; a travelable lane acquisition unit that acquires a travelable lane that the vehicle needs to travel along when entering the first intersection to exit in a specific exiting direction of the first intersection, when the vehicle needs to exit from the first intersection in the exiting direction to travel along the proposed travel route; and a lane guidance unit that selects and proposes as a recommended lane from the travelable lane, a lane that the vehicle needs to travel along when entering the first intersection, to travel along, after exiting from the first intersection, a lane that the vehicle needs to travel along when entering the second intersection to exit in a specific exiting direction of the second intersection, in a case where the vehicle needs to exit from the second intersection in the exiting direction to travel along the proposed travel route, when a distance between the first intersection and the second intersection is within a prescribed distance, and that proposes the travelable lane in a case where the distance between the first intersection and the second intersection is not within the prescribed distance.

That is, in the lane guidance system and the lane guidance program, when the distance between the first intersection and the second intersection is successive within the prescribed distance, it is assumed that there is little allowance for driving and the recommended lane is proposed after being narrowed down. In contrast, when the distance between the first intersection and the second intersection is not within the prescribed distance, there is a high possibility that the user can drive between the first intersection and the second intersection with allowance. Thus, the travelable lane is proposed so that the user can select by themselves, which lane that they want to drive. With the configuration described above, when at least the distance between the first intersection and the second intersection is not within the prescribed distance, there is low possibility that the user is misled that there is only one recommended lane, and it is possible to decrease the possibility that the user is misled compared to a configuration in which one recommended lane is constantly proposed.

BRIEF DESCRIPTION OF THE DRAWINGS

FIG. 2 is a flowchart of a lane guidance processing.

DETAILED DESCRIPTION

Hereinafter, embodiments of the disclosure will be described in the following order:
(1) Configuration of Navigation System:
(2) Lane Guidance Processing:
(3) Other Embodiments:

(1) Configuration of Navigation System

Figure 1:
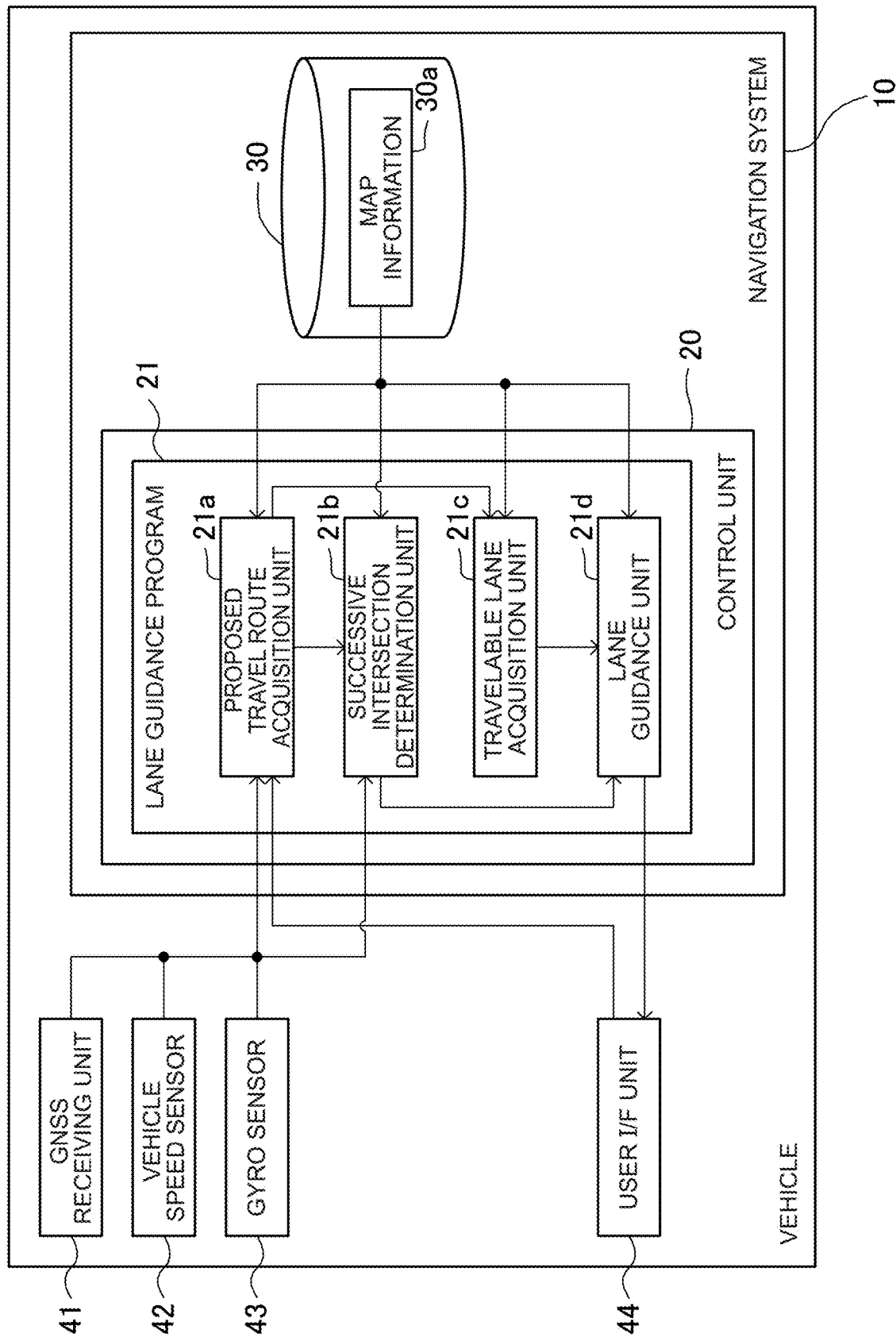
FIG. 1 is a block diagram of a navigation system.

FIG. 1 is a block diagram illustrating a configuration of a navigation system 10 including a lane guidance system according to a first embodiment of the present disclosure. The navigation system 10 is provided in a vehicle, and has a control unit 20 provided with a control processing unit (CPU), a random access memory (RAM), a read-only memory (ROM), and the like, and a recording medium 30. With the control unit 20, the navigation system 10 can execute a program stored in the recording medium 30 and the ROM. Map information 30a is recorded in the recording medium 30 beforehand.

The map information 30a is information used for identifying a location of a vehicle and a facility to be guided to. The map information includes node data that indicate positions of nodes set on a road that a vehicle travels along, shape interpolation point data that indicate positions of shape interpolation points for specifying the shape of roads between nodes, link data that indicate connections between nodes, and data that indicate positions of features that are on or around roads etc.

In the present embodiment, the information indicating a lane formation of a road for entering an intersection indicated by a node is associated with the link data and is stored. For example, there is a case where: a certain link data indicates a road for entering a certain node; there are three lanes on a road for entering an intersection indicated by the certain node; and a vehicle can travel straight or turn left in a left lane, a vehicle can travel straight in a middle lane, and a vehicle can turn right in a right lane. In such a case, the information indicating the above is associated with the link data as information that indicate a lane formation.

Figure 3A:
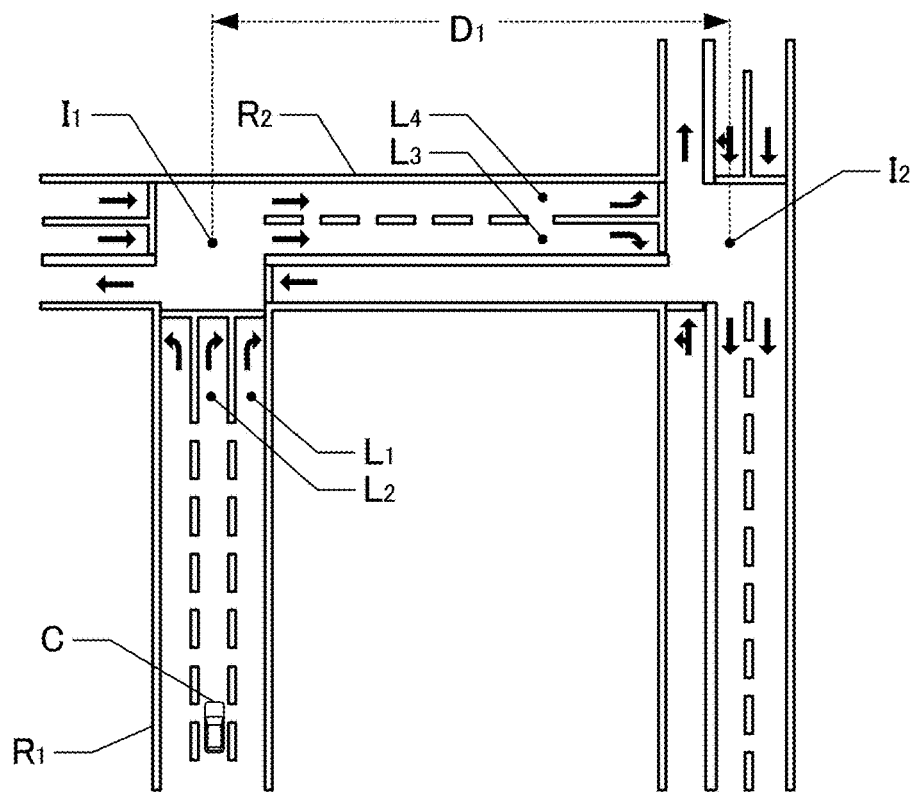
FIGS. 3A and 3B are diagrams illustrating actual examples of a first intersection and a second intersection.

In the present embodiment, a connection relationship between lanes within successive road sections is associated with a lane. For example, suppose there are two right-turn dedicated lanes in a road section connected to a certain intersection and there is a right-turn dedicated lane and a left-turn dedicated lane in a road section in which a vehicle travels after turning right at the intersection. An intersection $I_1$ indicated in FIG. 3A is an intersection that falls under the example. Right-turn dedicated lanes $L_1$, $L_2$ are connected to the intersection $I_1$. There is a right-turn dedicated lane $L_3$ and a left-turn dedicated lane $L_4$ in a road section that is travelable for a vehicle after the vehicle turns right at the intersection $I_1$.

In the example, when a vehicle enters the intersection $I_1$ from the right-turn dedicated lane $L_1$ and travels along a normal traveling path to turn right, the vehicle travels along the right-turn dedicated lane $L_3$ after turning right. In this case, information indicating that the right-turn dedicated lane $L_1$ before the intersection and the right-turn dedicated lane $L_3$ after passing through the intersection are a connected lane is thus associated with the lanes and is stored as the map information 30a. In contrast, when a vehicle enters the intersection $I_1$ from the right-turn dedicated lane $L_2$ and travels along a normal traveling path to turn right, the vehicle travels along the left-turn dedicated lane $L_4$ after turning right. In this case, information indicating that the right-turn dedicated lane $L_2$ before the intersection and the left-turn dedicated lane $L_4$ after passing through the intersection are a connected lane is thus associated with the lanes and is stored as the map information 30a.

A vehicle according to the present embodiment is provided with a global navigation satellite system (GNSS) receiving unit 41, a vehicle speed sensor 42, a gyro sensor 43, and a user interface (I/F) unit 44. The GNSS receiving unit 41 is a device for receiving signals from a global navigation satellite system. The GNSS receiving unit 41 receives radio waves from navigation satellites and outputs signals for calculating a present location of the vehicle via an interface not shown. The control unit 20 acquires the signals to acquire the present location of the vehicle. The vehicle speed sensor 42 outputs signals corresponding to a rotational speed of wheels of the vehicle. The control unit 20 acquires the signals via an interface not shown to acquire the vehicle speed. The gyro sensor 43 detects an angular acceleration of the vehicle for a turn in a horizontal plane and outputs signals corresponding to a direction in which the vehicle is headed. The control unit 20 acquires the signals to acquire the traveling direction of the vehicle. The vehicle speed sensor 42 and the gyro sensor 43 etc. are used to identify a traveling path of the vehicle. In the present embodiment, the present location is identified based on a departure point and a traveling path of the vehicle. The present location of the vehicle that is identified based on the departure point and the traveling path is corrected based on the output signals of the GNSS receiving unit 41.

The user I/F unit 44 is an interface unit that receives input of a command from a driver and that provides various kinds of information to the driver, and includes a touch panel display, a switch, a speaker, and so forth (not illustrated). That is, the user I/F unit 44 has an output unit for images and sounds and an input unit for a user command.

With a function of a navigation program not shown, the control unit 20 can execute a function of guiding the vehicle along a proposed travel route to a destination. Functions of the navigation program includes various functions, which include a lane guidance function. A lane guidance program 21 configures a part of the navigation program. With the lane guidance program 21, the control unit 20 can execute a function of proposing a travelable lane that the vehicle can travel along when the vehicle travels along the proposed travel route or a recommended lane that the vehicle needs to travel along when the vehicle travels along the proposed travel route.

To execute this function, the lane guidance program 21 has a proposed travel route acquisition unit 21a, a successive intersection determination unit 21b, a travelable lane acquisition unit 21c, and a lane guidance unit 21d. The proposed travel route acquisition unit 21a is a program module that causes the control unit 20 to execute a function of acquiring a proposed travel route of the vehicle. That is, with the function of the proposed travel route acquisition unit 21a, the control unit 20 receives an input of a destination from a driver via an input unit of the user I/F unit 44. The control unit 20 acquires the present location of the vehicle based on output signals of the GNSS receiving unit 41, the vehicle speed sensor 42, and the gyro sensor 43. The control unit 20 refers to the map information 30a, retrieves a route for departing from the present location to travel to the destination, and acquires the route as the proposed travel route.

The successive intersection determination unit 21b is a program module that causes the control unit 20 to execute the function of determining whether a distance between a first intersection and a second intersection is within a prescribed distance based on the proposed travel route. Here, the first intersection is a closest intersection ahead of the vehicle and the second intersection is a guidance intersection immediately after the first intersection. The control unit 20 specifies the guidance intersection based on the proposed travel route. In the present embodiment, an intersection at which the vehicle travels in a non-straight traveling direction is the guidance intersection.

The control unit 20 refers to the proposed travel route and the map information 30a and specifies the traveling direction of the vehicle at the intersection on the proposed travel route. The control unit 20 then specifies whether the traveling direction is a non-straight traveling direction based on whether a difference between a direction of entering the intersection and a direction of exiting the intersection is equal to or more than a specified angle, for example. The control unit 20 sets as the guidance intersection, the intersection at which the difference between the direction of entering the intersection and the direction of exiting the intersection is equal to or more than the specified angle. The guidance intersection only needs to be specified before lane guidance is performed, and may be specified at various timings.

Either way, the control unit 20 acquires the present location of the vehicle based on output signals of the GNSS receiving unit 41, the vehicle speed sensor 42, and the gyro sensor 43, while at least two closest guidance intersections that are ahead of the vehicle are specified. The control unit 20 refers to the map information 30a and assumes that the closest guidance intersection that is ahead of the present location of the vehicle is the first intersection. The control unit 20 assumes that the guidance intersection immediately after the first intersection is the second intersection. The control unit 20 then acquires the distance between the first intersection and the second intersection based on the map information 30a and determines whether the distance is within a prescribed distance that is determined beforehand. The prescribed distance is determined beforehand and is an index that indicates whether there is space between the first intersection and the second intersection for selecting a lane, changing lanes, and the like.

The travelable lane acquisition unit 21c is a program module that causes the control unit 20 to execute a function of acquiring a travelable lane in which the vehicle can travel along when the vehicle travels along the proposed travel route. That is, the control unit 20 refers to the proposed travel route and the map information 30a and specifies the direction of exiting from the first intersection when the vehicle travels along the proposed travel route. The control unit 20 specifies the lanes on the road in the direction exiting the intersection and specifies the lane connected to any of the lanes among the lanes of the road before the first intersection.

In an example illustrated in FIG. 3A, suppose a vehicle C is traveling along a road $R_1$ and the proposed travel route is a route of turning right at the intersection $I_1$ and turning left at an intersection $I_2$. In such a case, the intersection $I_1$ is the first intersection and the control unit 20 specifies that the direction of turning right to exit the intersection $I_1$ toward a road $R_2$ is the direction of exit. The control unit 20 then specifies the lanes $L_3$, $L_4$ of the road $R_2$ and specifies as the travelable lane, the lanes $L_1$, $L_2$ that are on the road $R_1$ and that are connected to either one of the lanes $L_3$, $L_4$.

The lane guidance unit 21d is a program module that causes the control unit 20 to execute a function of proposing a lane before arriving at the first intersection. That is, the control unit 20 generates image information and sound information for proposing a travelable lane or a recommended lane that is specified from the travelable lane, and outputs the generated information to the user I/F unit 44 before arriving at the first intersection. As a result, the travelable lane or the recommended lane is shown on a display of the user I/F unit 44 and information of the travelable lane or the recommended lane is output from a speaker of the user I/F unit 44.

In the present embodiment, the control unit 20 sets the object to be proposed as the travelable lane or the recommended lane, based on the distance between the first intersection and the second intersection. That is, when the distance between the first intersection and the second intersection is within a prescribed distance, the control unit 20 selects the recommended lane from the travelable lane and sets the selected recommended lane as the object to be proposed. The recommended lane is a lane that the vehicle needs to travel along when the vehicle travels along the proposed travel route. In the present embodiment, the recommended lane is determined based on the direction of exiting from the second intersection.

The control unit 20 thus specifies the direction of exiting the second intersection when the vehicle travels along the proposed travel route. The control unit 20 specifies the lane which the vehicle needs to travel along when entering the second intersection to exit from the second intersection in the direction of exiting the second intersection, based on the map information 30a. The control unit 20 then extracts a lane connected to the lane, which the vehicle needs to travel along when entering the second intersection, from the lane before the first intersection to determine the recommended lane. In the example illustrated in FIG. 3A, suppose the proposed travel route is a route of turning right at the intersection $I_1$ and turning left at the intersection $I_2$. In such a case, the intersection $I_2$ is the second intersection and the vehicle needs to travel along the lane $L_4$ when entering the intersection $I_2$ in order to travel in the left turning direction that is the direction of exiting from the second intersection. In this case, the control unit 20 specifies that the lane $L_2$ is connected to the lane $L_4$ based on the map information 30a and specifies the lane $L_2$ as the recommended lane.

In contrast, the control unit 20 sets the travelable lane as the object to be proposed when the distance between the first intersection and the second intersection is not within the prescribed distance. That is, the control unit 20 sets as the objects to be proposed, all lanes acquired with the function of the travelable lane acquisition unit 21c.

In the configuration described above, when the distance between the first intersection and the second intersection is shorter than the prescribed distance, there is little space between the first intersection and the second intersection for selecting a lane, changing lanes, and the like. In such a case, if the control unit 20 proposes a recommended lane, the user can recognize an appropriate lane without hesitation.

In contrast, when the distance between the first intersection and the second intersection is longer than the prescribed distance, there is space between the first intersection and the second intersection for selecting a lane, changing lanes, and the like. In such a case, if the control unit 20 proposes a travelable lane, the user will not be misled that it is necessary to travel along a specific lane. For example, suppose there is a road section with traffic congestion due to an accident on a recommended lane or on a lane to which the vehicle arrives after traveling along the recommended lane, and the vehicle will not be caught in traffic congestion if the vehicle changes lanes after avoiding the road section. In such a case, it is easier for the user to take action to avoid traffic congestion under the user's own decision. In addition, since the user will not be misled that it is necessary to immediately change lanes to the recommended lane, a forceful lane change will not be induced.

(2) Lane Guidance Processing

Next, lane guidance processing by the lane guidance program 21 will be described. FIG. 2 is a flowchart of the lane guidance processing executed by the lane guidance program 21. When the user operates the user I/F unit 44 to select the destination and issue a command to retrieve a route, the control unit 20 acquires the proposed travel route based on the map information 30*a*, with the function of the proposed travel route acquisition unit 21*a*. With the function of the successive intersection determination unit 21*b*, the control unit 20 acquires the guidance intersection on the proposed travel route. The two closest guidance intersections ahead of the vehicle may be acquired or all of the guidance intersections may be acquired beforehand.

Either way, the control unit 20 executes lane guidance processing indicated in FIG. 2 every constant period (for example, 100 ms), while at least the two closest guidance intersections are specified. When the lane guidance processing is started, the control unit 20 determines whether the distance is equal to or less than the predetermined distance to the guidance intersection ahead of the vehicle, with the function of the successive intersection determination unit 21*b* (step S100). That is, the predetermined distance is set as a trigger for starting the processing for lane guidance and the control unit 20 evaluates the distance to the guidance intersection based on the predetermined distance. The control unit 20 acquires the present location of the vehicle based on output signals of the GNSS receiving unit 41, the vehicle speed sensor 42, and the gyro sensor 43. The control unit 20 refers to the map information 30*a* to specify the guidance intersection ahead of the vehicle that is the closest to the vehicle, acquires the distance between the guidance intersection and the present location, and compares the distance with the predetermined distance.

When it is not determined in step S100 that the distance between the guidance intersection ahead and the present location is equal to or less than the predetermined distance, the control unit 20 ends the lane guidance processing. In contrast, when it is determined that the distance between the guidance intersection ahead and the present location is equal to or less than the predetermined distance in step S100, the control unit 20 acquires the distance between the first intersection and the second intersection with the function of the successive intersection determination unit 21*b* (step S105). That is, the control unit 20 refers to the map information 30*a*, specifies the guidance intersection ahead of the vehicle that is the closest to the vehicle and the guidance intersection immediately thereafter, and assumes that the guidance intersection that is the closest to the vehicle is the first intersection and that the guidance intersection immediately thereafter is the second intersection. The control unit 20 refers to the map information 30*a* and acquires the distance between the first intersection and the second intersection.

Figure 3B:
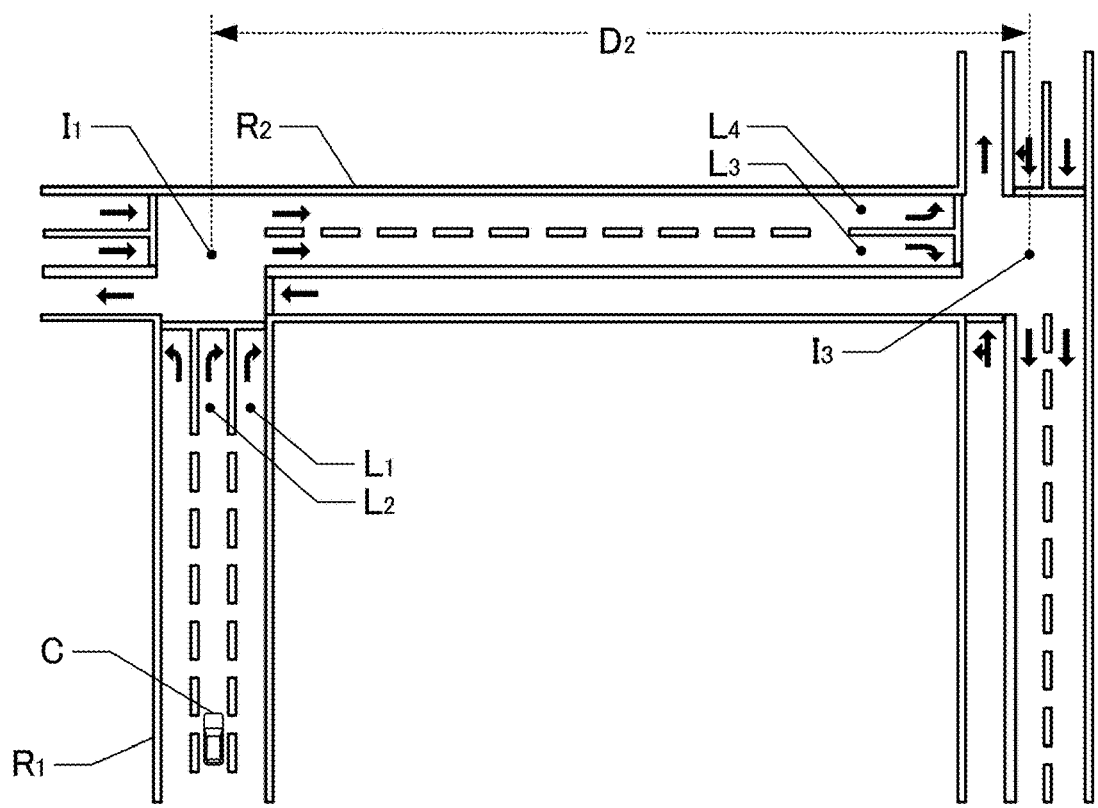

FIGS. 3A and 3B illustrate actual examples of a road. When step S105 is executed by the vehicle C illustrated in FIG. 3A, the intersection $I_1$ is the first intersection, the intersection $I_2$ is the second intersection, and a distance $D_1$ between the two is acquired. In the example illustrated in FIG. 3B, a road that is almost the same as the road illustrated in FIG. 3A is shown, and the example in which only the distance between the intersections differs is shown. In FIG. 3B, components that are the same as those in FIG. 3A are given the same symbols. In comparison to FIG. 3A, a symbol ($I_3$) different from FIG. 3A is given to the intersection $I_3$ since the intersection $I_3$ that corresponds to the second intersection is far from the intersection $I_1$ that is the first intersection. When step S105 is executed by the vehicle C illustrated in FIG. 3B, the intersection $I_1$ is the first intersection, the intersection $I_3$ is the second intersection, and a distance $D_2$ between the two is acquired.

With a function of the lane guidance unit 21*d*, the control unit 20 determines whether the distance between the first intersection and the second intersection is equal to or less than the prescribed distance (step S110). Here, suppose the distance $D_1$ illustrated in FIG. 3A is equal to or less than the prescribed distance and the distance $D_2$ illustrated in FIG. 3B is not equal to or less than the prescribed distance. In FIG. 3A, it is determined that the distance between the first intersection and the second intersection is equal to or less than the prescribed distance in step S110. In FIG. 3B, it is not determined that the distance between the first intersection and the second intersection is equal to or less than the prescribed distance in step S110.

When it is determined that the distance between the first intersection and the second intersection is equal to or less than the prescribed distance in step S110, the control unit 20 acquires and proposes the recommended lane with the functions of the travelable lane acquisition unit 21*c* and the lane guidance unit 21*d* (step S115). In order to acquire the recommended lane, the control unit 20 first acquires the travelable lane with the function of the travelable lane acquisition unit 21*c*. That is, the control unit 20 refers to the proposed travel route and the map information 30*a*, and specifies the lanes on the road that is in the exiting direction for exiting from the first intersection when the vehicle travels along the proposed travel route.

In the example illustrated in FIG. 3A, the control unit 20 specifies the lanes $L_3$, $L_4$ on the road $R_2$ that is in the right turning direction, which is the exiting direction from the intersection $I_1$ that is the first intersection. The control unit 20 refers to the map information 30*a* and specifies from the lane before the first intersection, the lane that is connected to the lane on the road in the exiting direction of exiting from the first intersection. In the example illustrated in FIG. 3A, the control unit 20 extracts the lanes $L_1$, $L_2$ connected to the lanes $L_3$, $L_4$ from the road $R_1$ and sets the extracted lanes as the travelable lanes.

The control unit 20 specifies the recommended lane based on the exiting direction from the second intersection. The control unit 20 thus specifies the exiting direction at the second intersection based on the proposed travel route and the map information 30*a*. The control unit 20 specifies the lane which the vehicle needs to travel along when entering the second intersection to exit from the second intersection in the exiting direction, based on the map information 30*a*. The control unit 20 then extracts a lane connected to the lane, which the vehicle needs to travel along when entering the second intersection, from the lane before the first intersection and sets the extracted lane as the recommended lane. In the example illustrated in FIG. 3A, the control unit 20 specifies that the exiting direction from the intersection $I_2$ that is the second intersection is the left turning direction and that the vehicle needs to travel along the lane $L_4$ when entering the intersection $I_2$ in order to turn left at the intersection $I_2$. The control unit 20 acquires the lane $L_2$ connected to the lane $L_4$ as the recommended lane.

When the recommended lane is acquired, the control unit 20 causes the display of the user I/F unit 44 to show the recommended lane and causes the speaker of the user I/F unit 44 to output sound indicating the recommended lane, with the function of the lane guidance unit 21*d*. As a result, the recommended lane is proposed to the user before arriving at the first intersection.

When it is not determined that the distance between the first intersection and the second intersection is equal to or less than the prescribed distance in step S110, the control unit 20 acquires and proposes the travelable lane with the functions of the travelable lane acquisition unit 21*c* and the lane guidance unit 21*d* (step S120). That is, the control unit 20 refers to the proposed travel route and the map information 30*a*, and specifies the lanes on the road that is in the exiting direction for exiting from the first intersection when the vehicle travels along the proposed travel route. In the example illustrated in FIG. 3B, the control unit 20 specifies the lanes $L_3$, $L_4$ on the road $R_2$ that is in the right turning direction, which is the exiting direction from the intersection $I_1$ that is the first intersection. The control unit 20 refers to the map information 30*a* and specifies from the lane before the first intersection, the lane that is connected to the lane on the road in the exiting direction of exiting from the first intersection. In the example illustrated in FIG. 3B, the control unit 20 extracts the lanes $L_1$, $L_2$ connected to the lanes $L_3$, $L_4$ from the road $R_1$ and sets the extracted lanes as the travelable lanes.

When the travelable lane is acquired, the control unit 20 causes the display of the user I/F unit 44 to show the travelable lane and causes the speaker of the user I/F unit 44 to indicate the travelable lane, with the function of the lane guidance unit 21*d*. As a result, the travelable lane is proposed to the user before arriving at the first intersection.

(3) Other Embodiments

The embodiment described above is an example for carrying out the various aspects of the disclosure, a variety of other embodiments can be adopted as long as the lane that is the object to be proposed is switched based on the distance between the first intersection and the second intersection. For example, the lane guidance system may be a device installed in a vehicle etc., a device that is implemented by a portable terminal, or a system that is implemented by a plurality of devices (such as a client and a server).

Various configurations can be considered as a configuration in which at least a part of the proposed travel route acquisition unit 21*a*, the successive intersection determination unit 21*b*, the travelable lane acquisition unit 21*c*, and the lane guidance unit 21*d* that configure the lane guidance system are provided separately in a plurality of devices. For example, the configuration may be such that the proposed travel route, the travelable lane, and the recommended lane are acquired by the navigation system making a request to a server via communication. A part of the configuration of the embodiment described above may be omitted, the order of the processing may be changed, or some of the processing may be omitted.

The proposed travel route acquisition unit only needs to be capable of acquiring the proposed travel route of the vehicle. As described above, the proposed travel route may be a route acquired by retrieving a route from the departure point to the destination or may be a proposed travel route that is estimated from a travel history of the past, and may be acquired through various methods.

The successive intersection determination unit only needs to be capable of determining whether the distance between the first intersection and the second intersection is within the prescribed distance based on the proposed travel route, the first intersection being the closest guidance intersection ahead of the vehicle and the second intersection being the guidance intersection immediately after the first intersection. That is, the lane guidance system only needs to be configured to be capable of switching the lane that is to be proposed to the recommended lane and the travelable lane based on whether there is space, when the distance between the first intersection and the second intersection is short and there is no space.

The prescribed distance only needs to be determined beforehand so that it can be assumed that there is space when the distance between the guidance intersections is longer than the prescribed distance. For example, a configuration can be adopted in which it is statistically determined based on the index of whether it is possible to change lanes with allowance. The guidance intersection is the intersection at which the proposal related to the intersection is performed before the intersection and the guidance intersection may be specified based on various conditions. For example, an intersection at which the vehicle travels in a non-straight traveling direction, an intersection with many lanes that the vehicle can enter, an intersection with a complex shape, and an intersection at which five or more roads are connected can be set as the guidance intersection.

The travelable lane acquisition unit only needs to be capable of acquiring a travelable lane that the vehicle can travel along when the vehicle travels along the proposed travel route. That is, when there is a plurality of lanes that the vehicle can enter at the intersection, there is a case where there is a restriction that the vehicle needs to enter the intersection from a specific lane to exit in a specific direction. Thus, to exit from the intersection in a specific direction to travel along the proposed travel route, a case in which the vehicle needs to use a specific lane to enter the intersection may arise. In such a case, the specific lane is the travelable lane.

In contrast, when there is a plurality of travelable lanes, there is a case in which the lane that the vehicle needs to travel along when the vehicle travels along the proposed travel route is further limited. That is, when the first intersection and the second intersection are successive, there is a case in which the vehicle cannot travel along the travelable lane when entering the second intersection (or the vehicle needs to change lanes to travel) if the vehicle is traveling along a specific lane among the travelable lanes when entering the first intersection. In such a case, among the travelable lanes at the first intersection, the lane that is connected to the travelable lane at the second intersection is the recommended lane.

The lane guidance unit only needs to be capable of selecting and proposing the recommended route, which the vehicle needs to travel along when traveling along the proposed travel route, from the travelable lanes, before arriving at the first intersection, when the distance between the first intersection and the second intersection is within the prescribed distance, and be capable of proposing the travelable lane, before arriving at the first intersection, when the distance between the first intersection and the second intersection is not within the prescribed distance. That is, the lane guidance unit only needs to be capable of switching the lane that is the object to be proposed, based on the distance between the first intersection and the second intersection.

When the distance between the first intersection and the second intersection is short and there is a relatively low possibility that the user can drive between the first intersection and the second intersection with allowance, it is preferable that the recommended lane be specifically proposed. As a result, there is a high possibility that the vehicle can exit the second intersection without changing lanes after passing through the first intersection and travel along the proposed travel route. When the distance between the first intersection and the second intersection is long and there is a relatively high possibility that the user can drive between the first intersection and the second intersection with allowance, it is preferable that an option be provided to the user by proposing the travelable lane.

The proposal of the travelable lane and the recommended lane may be performed in various forms and may be a proposal by voice or a proposal through a head up display (HUD), besides the embodiment described above. The proposal by the lane guidance unit is performed before arriving at the first intersection. However, a configuration may be such that the travelable lane and the recommended lane at the second intersection are proposed after passing through the first intersection and before arriving at the second intersection.

Figure 4A:
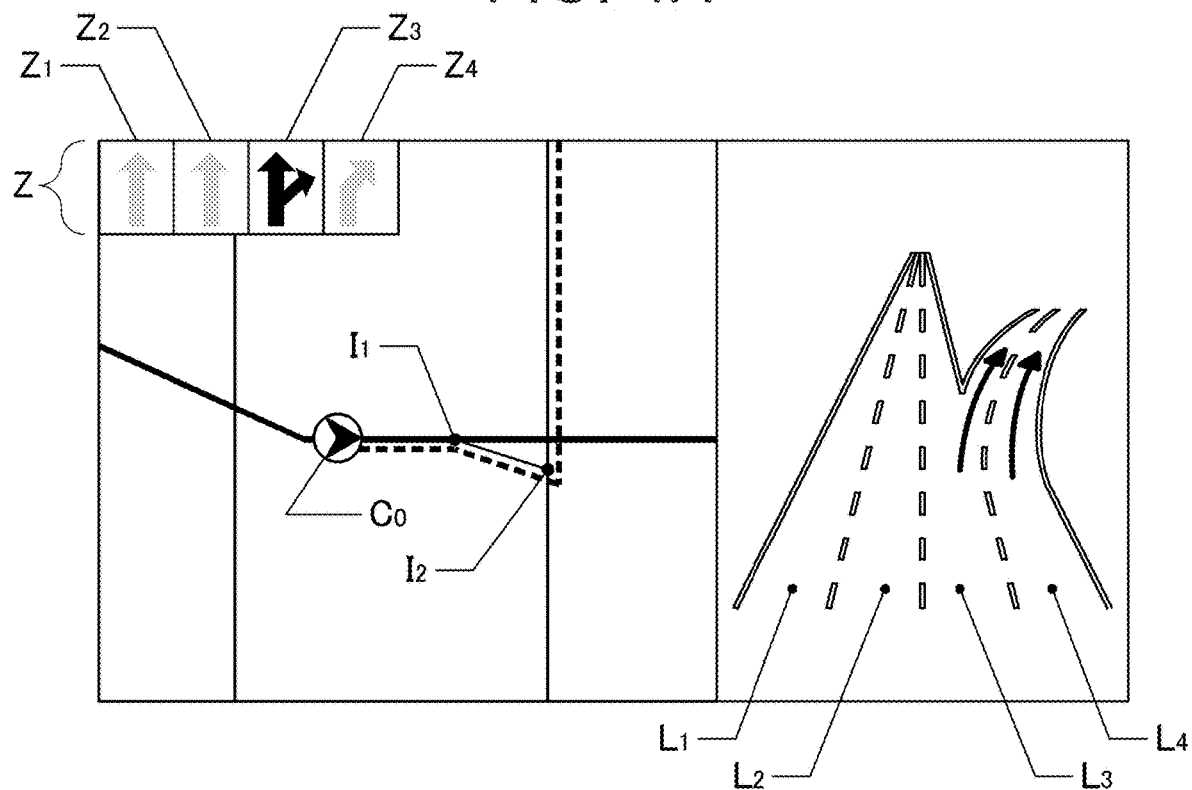
FIG. 4A is a diagram illustrating an example of proposing a travelable lane and FIG. 4B is a diagram illustrating an example of proposing a recommended lane.
Figure 4B:
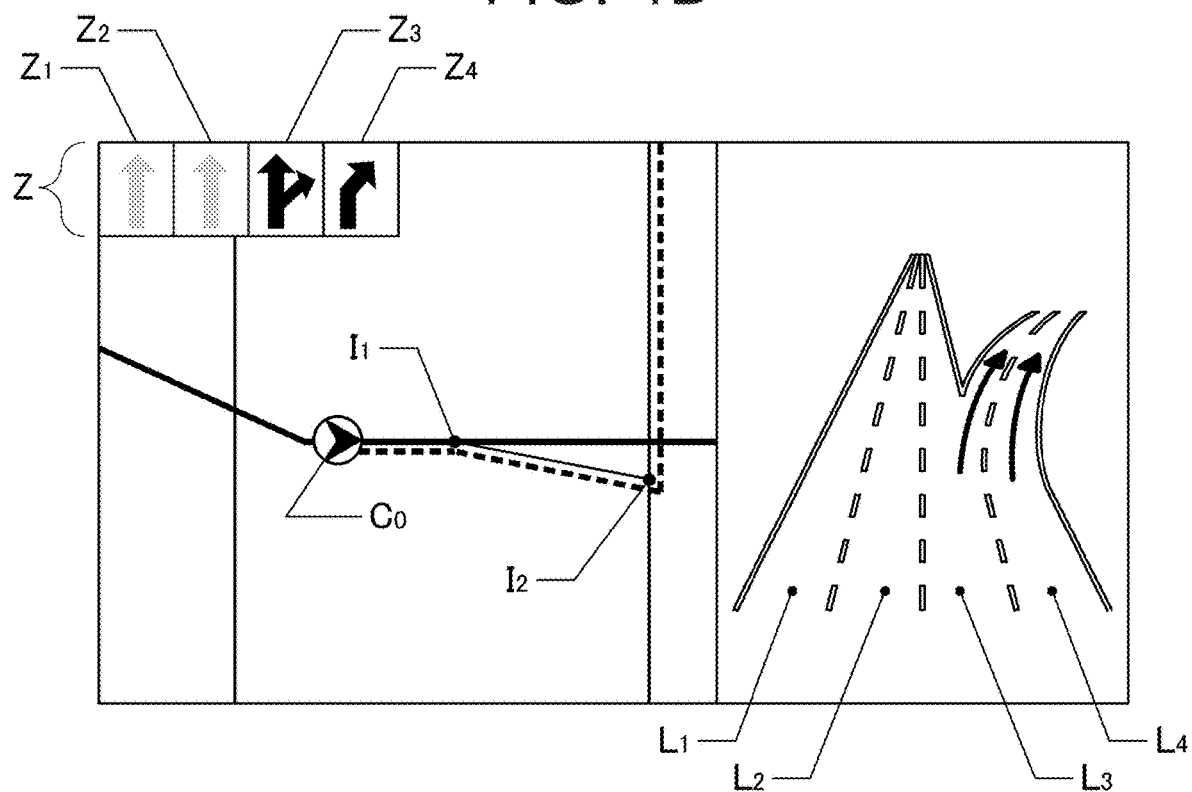

FIGS. 4A and 4B illustrate examples in which the travelable lane is proposed with images. FIGS. 4A and 4B illustrate examples of images that are shown on the output unit of the user I/F unit 44. In these examples, a peripheral map of a present location $C_0$ of the vehicle is shown on a left side of a screen. In the map, a road indicated by a thick line is a highway, a road indicated by a thin line is an ordinary road, and a broken line is the proposed travel route.

That is, in each figure, a proposed travel route is illustrated as an example, in which the vehicle exits from the highway at the intersection $I_1$ (branch point) ahead while traveling along the highway and turns left at the intersection $I_2$ immediately after the branch point. In FIGS. 4A and 4B, distance between the intersections $I_1$, $I_2$ are different. In FIG. 4A, a case in which the distance between the intersections $I_1$, $I_2$ is within the prescribed distance is considered. In FIG. 4B, a case in which the distance between the intersections $I_1$, $I_2$ is not within the prescribed distance is considered.

On a right side of the screen, an enlarged view of the intersection $I_1$ ahead of the vehicle that is the closest to the vehicle is shown. In the enlarged view, an arrow indicating a direction that the vehicle needs to travel when the vehicle travels along the proposed travel route is superimposed on the road.

In these examples, information related to lanes at an intersection just ahead of the vehicle are shown in an area Z shown at the top left of the map. That is, the lanes on which the vehicle can enter the intersection $I_1$ are the four lanes $L_1$ to $L_4$ (see the enlarged view). The lanes that the vehicle needs to travel along just before the intersection $I_1$ to exit the intersection $I_1$ in the straight traveling direction are the lanes $L_1$ to $L_3$. The lanes that the vehicle needs to travel along just before the intersection $I_1$ to exit the intersection $I_1$ in a diagonal right direction are the lanes $L_3$, $L_4$. When the vehicle travels along the lane $L_3$, the vehicle can exit in either the straight traveling direction or the diagonal right direction. However, when the vehicle travels along the lanes $L_1$, $L_2$, the vehicle can exit only in the straight traveling direction. When the vehicle travels along the lane $L_4$, the vehicle can exit only in the diagonal right direction.

In the area Z, the directions that the vehicle can exit in these lanes are indicated by arrows within rectangles. That is, arrows that indicate the straight traveling direction are illustrated in rectangles $Z_1$, $Z_2$ indicating the lanes $L_1$, $L_2$, and an arrow that indicates the straight traveling direction and the diagonal right direction is illustrated in a rectangle $Z_3$ indicating the lane $L_3$. An arrow that indicates the diagonal right direction is illustrated in a rectangle $Z_4$ indicating the lane $L_4$.

In the present example, the travelable lane or the recommended lane is proposed in these examples. That is, in the present example, when the intersections $I_1$, $I_2$ are the first intersection and the second intersection respectively, the lanes in which the vehicle needs to travel along when entering the intersection $I_1$ to exit in the diagonal right direction from the intersection $I_1$ that is the first intersection are the lanes $L_3$, $L_4$. Thus, the lanes $L_3$, $L_4$ are the travelable lanes.

In contrast, either a right turn or a left turn is possible at the intersection $I_2$ that is the second intersection. In the present example, the lanes $L_3$, $L_4$ are extended to reach the intersection $I_2$. A left turn is possible but a right turn is not possible at the intersection $I_2$, in a lane (not shown) formed by the lane $L_3$ extending to reach the intersection $I_2$. In contrast, with a lane (not shown) formed by the lane $L_4$ extending to reach the intersection $I_2$, a right turn is possible but a left turn is not possible at the intersection $I_2$. Thus, when the vehicle enters the intersection $I_2$ in order to turn left at the intersection $I_2$ that is the second intersection so as to travel along the proposed travel route, the lane that the vehicle needs to travel along is the left side lane. The left side lane is the lane formed by the lane $L_3$ extending to reach the intersection $I_2$. Therefore, the lane $L_3$ is the recommended lane.

FIGS. 4A and 4B illustrate examples in which the travelable lane and the recommended lane are emphasized in black when the two are proposed and the lane that is not an object to be proposed is indicated in gray. That is, in the example illustrated in FIG. 4A, the distance between the intersection $I_1$ that is the first intersection and the intersection $I_2$ that is the second intersection is within the prescribed distance. Thus, the object to be proposed is the recommended lane, the arrow in the rectangle $Z_3$ indicating the lane $L_3$ that is the recommended lane is shown in black, and the other lanes are shown in gray. In FIG. 4B, the distance between the intersection $I_1$ that is the first intersection and the intersection $I_2$ that is the second intersection is not within the prescribed distance. Thus, the object to be proposed is the travelable lane, the arrows in the rectangles $Z_3$, $Z_4$ indicating the lanes $L_3$, $L_4$ that are travelable lanes are shown in black, and the other lanes are shown in gray. With the configuration described above, when at least the distance between the first intersection and the second intersection is not within the prescribed distance, there is low possibility that the user is misled that there is only one recommended lane, and it is possible to decrease the possibility that the user is misled compared to a configuration in which one recommended lane is constantly proposed.

In the configuration in which the lane that is the object to be proposed is switched according to the distance between the first intersection and the second intersection, the configuration may be such that an exceptional processing is performed in a specific case. For example, a configuration may be adopted such that the lane guidance unit proposes the travelable lane when it is specified that there is a non-recommended lane, which the vehicle is not recommended to travel along, between the first intersection and the second intersection and it is not specified which lane among the plurality of lanes is the non-recommended lane, in a case where the distance between the first intersection and the second intersection is within the prescribed distance.

That is, when there is a lane in which normal traveling is not possible due to a road being blocked because of an accident or due to traffic congestion, the lane is the non-recommended lane along which travel is not recommended. The occurrence of a non-recommended lane can be specified by measuring the amount of traffic of a road or by collecting a travel history of a vehicle. If the amount of traffic can be measured or if the travel history can be collected for every lane, it is possible to also specify which lane of the road is the non-recommended lane and not just specify the occurrence of a non-recommended lane.

However, measuring the amount of traffic and collecting travel history for every lane is costly in terms of maintaining measurement sensors and improving the positioning accuracy on the vehicle side. Thus, although realization on all roads is difficult, realization on some roads is realistic. Therefore, it is possible to consider the coexistence of a case where only the presence of the non-recommended lane is specified and a case of where it is specified which lane among a plurality of lanes is the non-recommended lane.

When it is possible to specify which lane among the plurality of lanes is the non-recommended lane, it is possible to clearly guide the user by not assuming that the non-recommended lane is the recommended lane or the travelable lane. In contrast, when it is not specified which lane among the plurality of lanes is the non-recommended lane and the presence of the non-recommended lane is specified, it is not possible to determine whether the non-recommended lane and the recommended lane coincide. If the configuration is such that the lane guidance unit proposes the travelable lane, when the presence of the non-recommended lane is specified and it is not specified which lane among the plurality of lanes is the non-recommended lane, the possibility that the non-recommended lane is set as the recommended lane can be decreased and the possibility that the user is guided to the non-recommended lane can be decreased.

The configuration in which the lane guidance unit performs processing based on the non-recommended lane can be realized by adding a communication unit to the configuration illustrated in FIG. 1 described above. That is, a traffic information management server that collects the presence of the non-recommended lane and a position of the non-recommended lane (information indicating which lane among the plurality of lanes is the non-recommended lane) is configured outside the vehicle, and a communication unit of the vehicle is configured to be capable of communicating with the traffic information management server.

The control unit 20 is configured to acquire information related to the non-recommended lane on the road between the first intersection and the second intersection via the communication unit, before proposing a lane, with the function of the lane guidance unit 21d. When information related to the non-recommended lane is acquired and the distance between the first intersection and the second intersection is within the prescribed distance, the control unit 20 may determine the lane to be proposed based on the acquired information, with the function of the lane guidance unit 21d. That is, the configuration is such that when the presence of the non-recommended lane on which traveling is not recommended is specified between the first intersection and the second intersection, and it is not specified which lane among the plurality of lanes is the non-recommended lane, the control unit 20 proposes the travelable lane with the function of the lane guidance unit 21d. With such a configuration, the possibility that the non-recommended lane is set as the recommended lane can be decreased and the possibility that the user is guided to the non-recommended lane can be decreased.

As in the present disclosure, the technique of switching the lane to be proposed based on the distance between the first intersection and the second intersection can be adopted as a program or a method. In addition, it can be assumed that the system, the program, and the method described above are implemented as a single device or implemented by a plurality of devices. The system, the program, and the method include a variety of aspects. For example, it is possible to provide a navigation system, a method, and a program that include the means described above. Various changes may also be made. For example, some units may be implemented using software, and some units may be implemented using hardware. Further, the various aspects of the disclosure may be implemented as a recording medium for a program that controls the system. The recording medium for the software may be a magnetic recording medium or a magneto-optical recording medium. The same applies to any recording medium that will be developed in the future.

10 . . . Navigation system, 20 . . . Control unit, 21 . . . Lane guidance program, 21a . . . Proposed travel route acquisition unit, 21b . . . Successive intersection determination unit, 21c . . . Travelable lane acquisition unit, 21d . . . Lane guidance unit, 30 . . . Recording medium, 30a . . . Map information, 41 . . . GNSS receiving unit, 42 . . . Vehicle speed sensor, 43 . . . Gyro sensor, 44 . . . User I/F unit

The invention claimed is:

1. A lane guidance system comprising:
  a proposed travel route acquisition unit that acquires a proposed travel route of a vehicle;
  a successive intersection determination unit that determines whether a distance between a first intersection that is a guidance intersection on the proposed travel route and a second intersection that is a guidance intersection immediately after the first intersection is within a prescribed distance, based on the proposed travel route;
  a travelable lane acquisition unit that acquires a travelable lane that the vehicle needs to travel along when entering the first intersection to exit in a specific exiting direction of the first intersection, when the vehicle needs to exit from the first intersection in the exiting direction to travel along the proposed travel route; and
  a lane guidance unit that selects and proposes as a recommended lane from the travelable lane, a lane that the vehicle needs to travel along when entering the first intersection, to travel along, after exiting from the first intersection, a lane that the vehicle needs to travel along when entering the second intersection to exit by turning in a specific exiting direction of the second intersection, when the vehicle needs to exit from the second intersection in the exiting direction to travel along the proposed travel route, in a case where a distance between the first intersection and the second intersection is within a prescribed distance, and that proposes the travelable lane in a case where the distance between the first intersection and the second intersection is not within the prescribed distance.

2. The lane guidance system according to claim 1, wherein the lane guidance unit proposes the travelable lane when a presence of a non-recommended lane on which traveling is not recommended is specified between the first intersection and the second intersection and it is not specified which lane among a plurality of lanes is the non-recommended lane, in the case where the distance between the first intersection and the second intersection is within the prescribed distance.

3. A lane guidance program stored on a non-transitory computer readable medium that causes a computer to function as:
- a proposed travel route acquisition unit that acquires a proposed travel route of a vehicle;
- a successive intersection determination unit that determines whether a distance between a first intersection that is a guidance intersection on the proposed travel route and a second intersection that is a guidance intersection immediately after the first intersection is within a prescribed distance, based on the proposed travel route;
- a travelable lane acquisition unit that acquires a travelable lane that the vehicle needs to travel along when entering the first intersection to exit in a specific exiting direction of the first intersection, when the vehicle needs to exit from the first intersection in the exiting direction to travel along the proposed travel route; and
- a lane guidance unit that selects and proposes as a recommended lane from the travelable lane, a lane that the vehicle needs to travel along when entering the first intersection, to travel along, after exiting from the first intersection, a lane that the vehicle needs to travel along when entering the second intersection to exit by turning in a specific exiting direction of the second intersection, when the vehicle needs to exit from the second intersection in the exiting direction to travel along the proposed travel route, in a case where a distance between the first intersection and the second intersection is within a prescribed distance, and that proposes the travelable lane in a case where the distance between the first intersection and the second intersection is not within the prescribed distance.

* * * * *